E. M. CHANDLER.
CAMP COOKING OUTFIT.
APPLICATION FILED FEB. 25, 1915.
1,163,211.
Patented Dec. 7, 1915.
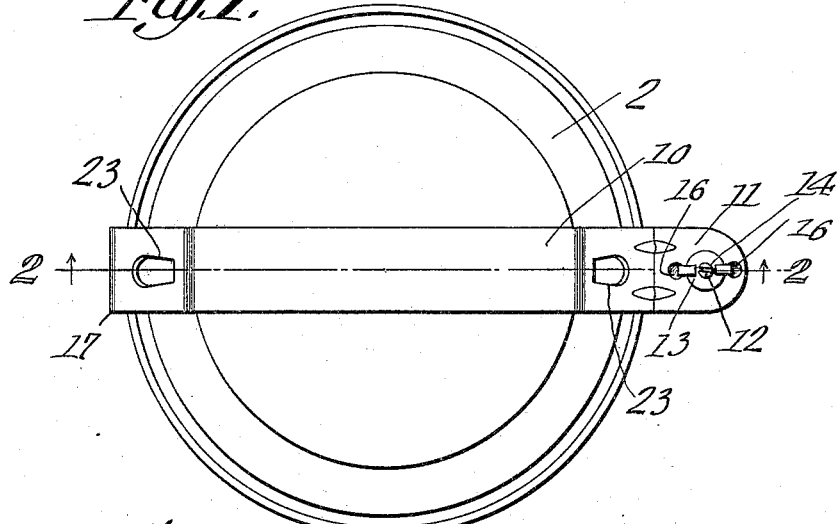
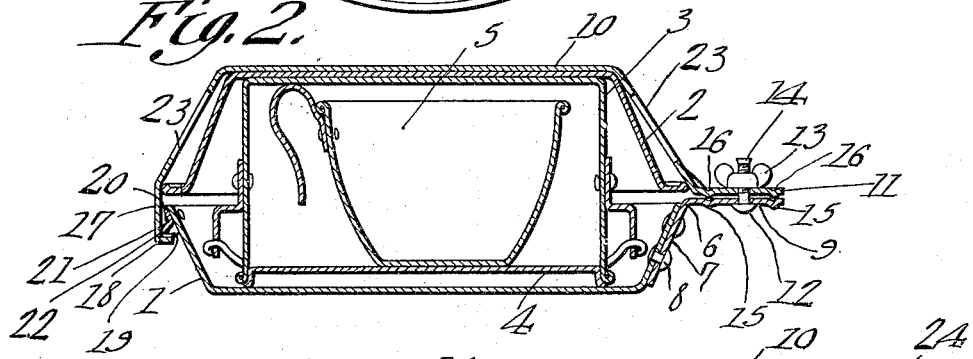
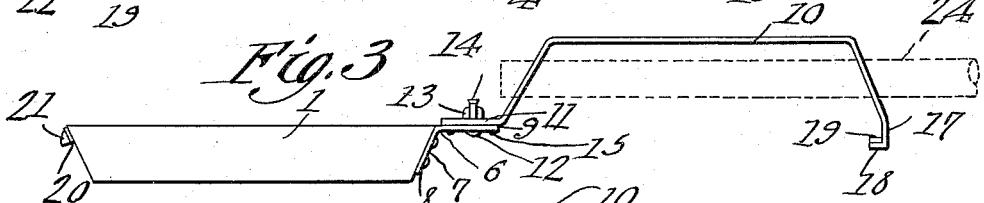
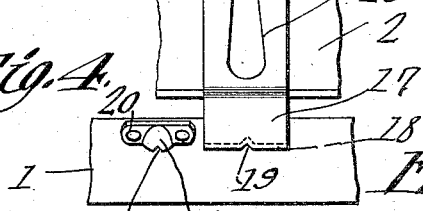
E. M. Chandler
Inventor
Witnesses
by
Attorneys

UNITED STATES PATENT OFFICE.

EDWARD M. CHANDLER, OF NEW KENSINGTON, PENNSYLVANIA.

CAMP COOKING OUTFIT.

1,163,211.  Specification of Letters Patent.  Patented Dec. 7, 1915.

Application filed February 25, 1915. Serial No. 10,572.

*To all whom it may concern:*

Be it known that I, EDWARD M. CHANDLER, a citizen of the United States, residing at New Kensington, in the county of Westmoreland and State of Pennsylvania, have invented a new and useful Camp Cooking Outfit, of which the following is a specification.

The present invention appertains to a camp cooking outfit, and aims to provide a camp outfit embodying several cooking utensils or vessels, which are capable of being compactly nested together when not in use, so that the outfit may be compactly stored or carried, and in order that the utensils when separated may be employed for frying, cooking, and the like.

As a more specific object, the invention aims to provide a frying pan or spider having a unique handle, which may be swung over and engaged with the pan, to hold the nested utensils in a compact condition, and to lock them together so as to prevent the separation, loss or rattling of the parts.

Another object of the invention is to provide a camp cooking outfit of comparatively simple and inexpensive construction, which may be compactly collapsed and nested when not in use, and which will be serviceable, convenient, practical and efficient in use.

With the foregoing and other objects in view which will appear as the description proceeds, and invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a plan view of the outfit in nested condition. Fig. 2 is a sectional view taken on the line 2—2 of Fig. 1. Fig. 3 is a side elevation of the spider or frying pan on a reduced scale, illustrating the handle thereof swung to position for holding the pan over the fire, or for handling the pan during the use thereof. Fig. 4 is a fragmental elevation illustrating the means for locking the free end of the handle to the pan, the parts being detached.

In carrying out the invention, there is provided a frying pan or spider, the body portion or pan proper of which is designated by the numeral 1. A cooking or boiling pan 2 is adapted to be assembled with the pan 1, as seen in Fig. 2, for providing a casing or housing for a vessel 3 having a removable cover 4. A cup 5 is adapted to be nested within the vessel 3. Thus, the cooking utensils 1, 2, 3 and 5 may be properly nested together when not in use, the cup 5 being held between the bottom and cover or lid of the vessel 3, and the vessel 2 being held snugly between the pans 1 and 2.

As a means for pivoting or attaching the handle to the pan 1, an angular member 6 has one arm 7 riveted or otherwise secured as at 8, to one side of the rim of the pan 1, and has its other arm 9 lying in the plane of the mouth or upper edge of the pan 1. The member 6, as well as the cooking utensils, may be constructed of sheet aluminum or other sheet metal.

The handle 10, which is formed from a strip of aluminum, or other sheet metal, is arched in form, and is provided with an outturned portion 11 at one end pivoted upon the arm 9 of the member 6, by means of a pivot and clamping bolt 12 extended upwardly through suitable apertures provided in the arm 9 and portion 11. A thumb or wing nut 13 is threaded upon the upper protruding end of the bolt 12 and bears upon the portion 11 of the handle, the upper end of the bolt 12 being preferably flattened, as at 14, to prevent the accidental detachment of the nut 13. Thus, when the nut 13 is loosened, the handle 10 is adapted to be swung about the axis of the bolt 12 parallel with the axis of the pan 1, or in the plane of the mouth or edge of the pan 1.

In order to hold the handle 10 either over the pan 1, or projecting therefrom, the arm 9 of the member 6 is provided with a pair of opposite depressions or sockets 15, and the portion 11 of the handle is provided with lugs 16 struck downwardly therefrom and adapted to enter the depressions or sockets 15 when the nut 13 is tightened. The nibs or lugs 16 are adapted to enter the depressions or sockets 15 at either position of the handle, in order that when the nut 13 is tightened, the handle will be locked against swinging movement relative to the pan 1.

Means is provided for latching or engaging the free end of the handle to that side of the pan 1 opposite the pivot 12 of the handle, and to this end, the free end of the handle 10 is provided with a depending portion 17 having an inturned lip 18, and the lip 18 is provided with an upstruck corrugation or rib 19 extending longitudinally relative to the handle. A keeper plate 20 is riveted or otherwise secured to the rim of the pan 1 opposite the member 6, and is provided with an outstruck lower bulge 21 having a lower central notch 22 for the engagement of the corrugation or rib 19. Thus, when the handle 10 is swung across or over the pan 1 so as to span or bridge the same, the corrugations or rib 19 of the free end of the handle is adapted to be snapped under the bulge 21 of the keeper plate 20 and into the notch 22, the handle 10 being sufficiently resilient or flexible for this purpose. Those portions of the handle 10 between the ends and intermediate or crest portion thereof, are each provided with an opening 23 which is tapered upwardly, or which decreases in width from its lower to its upper end.

In use, when the parts are nested together, as illustrated in Fig. 2, the handle 10 may be swung over the pan 1, so as to bear upon the pan 2, and by snapping the corrugation or rib 19 of the lip 18 of the handle under the keeper 20, the handle will be latched to the pan 1 and will be prevented from accidental detachment, and furthermore the latching of the handle 10 will hold the vessel 3 firmly between the pans 1 and 2. The nut 13 may be tightened to assist in clamping the parts together, and with the outfit in nested condition, it may be compactly stored or carried. If desired, a strap may be passed through the openings 23, for conveniently carrying the outfit from the shoulder of the person carrying the outfit.

When the handle 10 is swung out of engagement from the keeper 20, it will release the pan 2 and vessel 3, and the various cooking utensils may then be employed in their various capacities. The handle 10 may be swung so as to project radially from the pan 1, as illustrated in Fig. 3, and when this is done, the nut 13 is tightened for clamping the handle 10 to the member 6 of the pan 1. The handle 10 may then be conveniently grasped by the hand for handling or holding the pan 1, and if desired a stick 24, such as a branch from a tree, or the like, may be slipped through the openings 23 of the handle 10, and the pan 1 may thus be conveniently held over a fire, or the like, without the operator approaching too close thereto.

The present outfit may be employed by boy scouts or other campers, and provides a convenient cooking outfit which may be compactly nested and carried when not in use. The present kit is an extremely useful one, and has features which render it particularly desirable for camping and similar purposes.

Having thus described the invention, what is claimed as new is:

1. In a device of the character described, a pan, a handle pivoted to one side thereof to swing in the plane of the edge of the pan, the opposite side of the pan having a keeper provided with a lower notch, and the free end of the handle having means to snap under the keeper and into the said notch.

2. In a device of the character described, a pan, a handle pivoted to one side thereof to swing approximately in the plane of the mouth of the pan, the opposite side of the pan having an outstanding keeper provided with a lower notch, the free end of the handle having a depending portion provided with an inturned lip to pass under the keeper, the lip having an upstanding rib to engage in the said notch.

3. In a device of the character described, a pan, an arched handle having one end pivoted to one side of the pan, the opposite side of the pan and free end of the handle having interengageable means, and the handle having openings between its ends and intermediate portion for the reception of a stick or strap.

In testimony that I claim the foregoing as my own, I have hereto affixed my signature in the presence of two witnesses.

EDWARD M. CHANDLER.

Witnesses:
 JOHN K. BEGGS,
 JACKSON A. COCHRAN.

Copies of this patent may be obtained for five cents each, by addressing the "Commissioner of Patents, Washington, D. C."